ing the previous cycle are desorbed therefrom.

United States Patent
Hasz

[15] 3,712,027
[45] Jan. 23, 1973

[54] VAPOR ADSORPTION PROCESS FOR RECOVERING SELECTED COMPONENTS FROM A MULTI-COMPONENT GAS STREAM

[72] Inventor: John W. Hasz, Ponca City, Okla.
[73] Assignee: Continental Oil Company, Ponca City, Okla.
[22] Filed: Jan. 22, 1971
[21] Appl. No.: 109,720

[52] U.S. Cl. .............................. 55/33, 55/62, 55/68, 55/70, 55/73
[51] Int. Cl. ............................................ B01d 53/04
[58] Field of Search........ 55/33, 62, 68, 73, 179, 180, 55/70

[56] References Cited

UNITED STATES PATENTS 2,995,208  8/1961  Hachmuth et al. ............. 55/33
3,405,507  10/1968  Spencer et al. ................. 55/62

Primary Examiner—Charles N. Hart
Attorney—Joseph C. Kotarski, Henry H. Huth, Robert B. Coleman, Jr., Gerald L. Floyd and Carroll Palmer

[57] ABSTRACT

The present invention relates to an improved cyclic vapor adsorption process for recovering selected components from a multi-component feed gas stream wherein each of a plurality of adsorbent beds is contacted with the feed gas stream so that adsorbable components contained therein are adsorbed, then contacted with a regeneration gas stream so that adsorbed components are desorbed therefrom, and then contacted with a cooling gas stream so that the bed is cooled preparatory to again being contacted with the feed gas stream. The process includes a pair of compensator zones to provide temperature and volumetric compensation in the regeneration and cooling gas circuits, which zones are alternately connected into the cooling and regeneration gas circuits downstream of the adsorbent beds. Each of the compensator zones contains adsorbent material which has an affinity for unselected adsorbable components contained in the feed gas stream. As the regeneration gas stream is passed through one of the compensator zones unselected adsorbable components are adsorbed therefrom and a product stream comprised of selected components is produced. As the cooling gas stream passes through the other of said compensator zones the unselected adsorbable components described during the previous cycle are desorbed therefrom.

16 Claims, 2 Drawing Figures

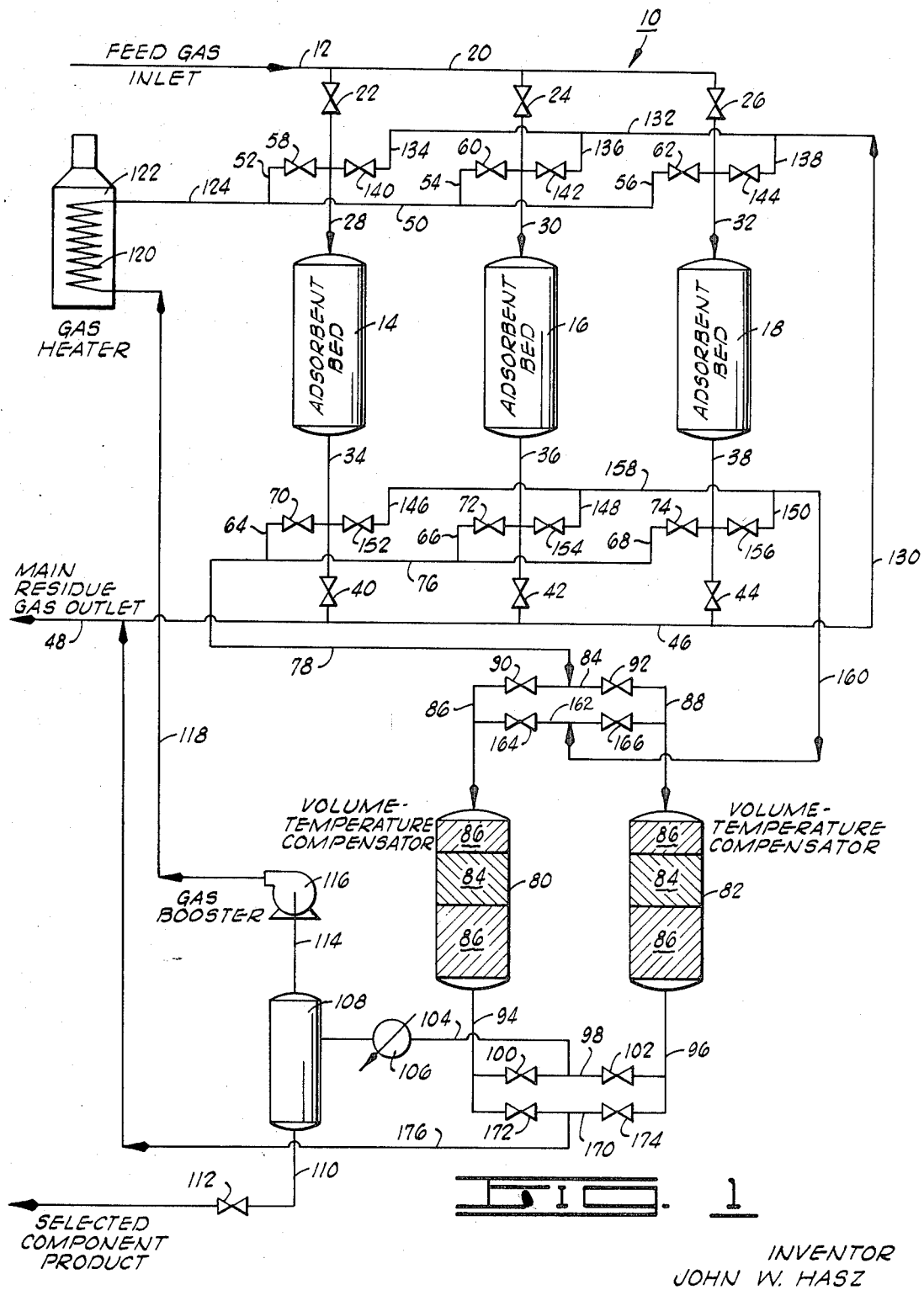

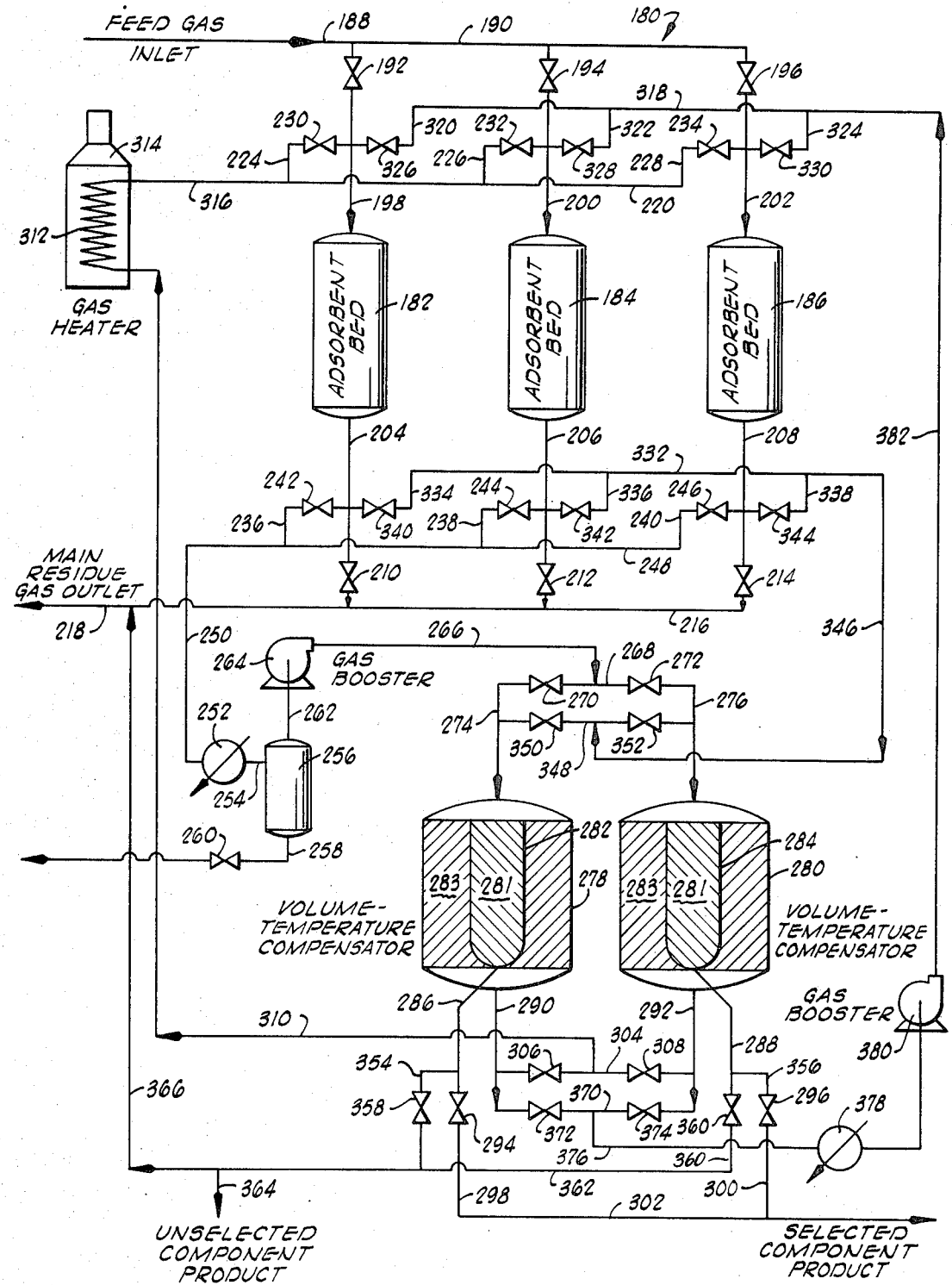

VAPOR ADSORPTION PROCESS FOR RECOVERING SELECTED COMPONENTS FROM A MULTI-COMPONENT GAS STREAM

BACKGROUND OF THE INVENTION

1. Field of the Invention

The present invention relates generally to a vapor adsorption process for recovering selected components from a gas stream, and more particularly, but not by way of limitation, to a cyclic vapor adsorption process for recovering selected components from a multi-component gas stream which process utilizes a plurality of stationary solid adsorbent beds and a pair of volume-temperature compensator zones.

2. Description of the Prior Art

Many continuous cyclic vapor adsorption processes have been developed comprised of a plurality of stationary adsorbent beds wherein one or more of the beds are used to recover adsorbable vapor components from a feed gas stream while the other beds are being regenerated. The term "adsorbable components" is used herein to mean those vapor components which are capable of being adsorbed and desorbed from a solid adsorbent bed, both of the readily condensible and non-condensible types. For example, hydrocarbon compounds contained in natural gas streams, such as methane, ethane, propane, butane, pentane, hexane, etc. as well as hydrogen sulfide, carbon dioxide and water are readily adsorbed by a variety of solid adsorbents and may be desorbed therefrom by contacting the adsorbent with a heated regeneration gas stream. In addition, components found in refinery gas streams, such as ethane, ethylene, sulfur dioxide, and ammonia are readily adsorbed and desorbed from the adsorbent materials.

A variety of solid adsorbent materials are commercially available for adsorbing components from gas streams. For example, solid adsorbents such as activated charcoal, activated alumina, and a variety of silica compounds are commonly used to adsorb hydrocarbon components from gas streams. However, the adsorbent materials suitable for adsorbing hydrocarbon components from a gas stream are not highly selective in that at least some of all the adsorbable components present in the gas stream will be adsorbed. Consequently, in the processing of natural gas and refinery gas streams with solid adsorbent material for the recovery of desirable hydrocarbon components contained therein, undesirable components such as carbon dioxide, hydrogen sulfide, water, sulfur dioxide, ammonia, etc. are also adsorbed.

While adsorbent materials, such as synthetic zeolite are highly selective to polar compounds such as hydrogen sulfide, carbon dioxide, water, etc., these materials will not readily adsorb the non-polar hydrocarbon materials.

Prior to the present invention, various processes have been used for separating undesirable components such as those mentioned above from a multi-component gas stream prior to processing the gas stream in a cyclic vapor adsorption process. For example, in processing natural gas streams containing undesirable hydrogen sulfide and carbon dioxide in addition to desirable hydrocarbon components, the natural gas streams are generally first processed for the removal of the hydrogen sulfide and carbon dioxide using a liquid absorbent such as an aqueous solution of monoethanolamine, and then processed in a vapor adsorption plant to recover desired hydrocarbon components. While these combination processes effectively bring about the recovery of selected components from a multi-component gas stream, they are expensive to install and operate in that extensive and complicated equipment is required.

By the present invention a vapor adsorption process is provided for recovering selected components from a multi-component gas stream which process does not require the separate removal of unselected components, and consequently, is simple and inexpensive as compared to heretofore used processes.

SUMMARY OF THE INVENTION

The present invention relates to a vapor adsorption process for recovering selected adsorbable components from a multi-component feed gas stream which comprises contacting at least one of a plurality of main solid adsorbent beds with the feed gas stream so that adsorbable components contained therein are adsorbed on the bed; simultaneously contacting at least another of the main adsorbent beds which has previously adsorbed adsorbable components from the feed gas stream with a heated regeneration gas stream so that the adsorbed components are desorbed from the bed into the regeneration gas stream; passing the regeneration gas stream containing desorbed components into a previously heated volume-temperature compensator zone containing adsorbent material having an affinity for unselected adsorbable components so that the zone is cooled, unselected adsorbable components in the regeneration gas stream are adsorbed on said adsorbent material, temperature and volumetric changes in the regeneration gas stream are compensated for and a residual regeneration gas stream containing selected adsorbable components is produced; recovering the selected adsorbable components from the regeneration gas stream; simultaneously contacting yet at least another of the plurality of main adsorbent beds with a cooling gas stream so that the bed is cooled preparatory to being contacted with the feed gas stream; passing the cooling gas stream into a previously cooled compensator zone containing adsorbent material having an affinity for unselected adsorbable components so that the zone is heated, unselected adsorbable components are desorbed from the adsorbent material into the cooling gas stream and temperature and volumetric changes in the cooling gas stream are compensated for; and cycling the feed gas, regeneration gas and cooling gas streams so that the main adsorbent bed just contacted with the feed gas stream is contacted with the regeneration gas stream, the main adsorbent bed just contacted with the cooling gas stream is contacted with the feed gas stream, the main adsorbent bed just contacted with the regeneration gas stream is contacted with the cooling gas stream, the regeneration gas stream is passed through the compensator zone just heated, and the cooling gas stream is passed through the compensator zone just cooled.

It is, therefore, an object of the present invention to provide a cyclic vapor adsorption process for recovering selected components from a multi-component gas stream.

A further object of the present invention is the provision of a vapor adsorption process wherein selected adsorbable components substantially free of unselected adsorbable components are efficiently recovered.

Yet a further object of the present invention is the provision of a cyclic vapor adsorption process for recovering selected components from a multi-component feed gas stream wherein temperature and volumetric changes in the regeneration and cooling gas streams are compensated for thereby increasing the adsorption efficiency of the process as well as conserving heat.

Still a further object of the present invention is the provision of an adsorption process for recovering selected components from a multi-component gas stream wherein the unselected components may also be recovered.

Another object of the present invention is to provide a process for recovering selected components from a multi-component gas stream which is relatively simple and inexpensive to install and operate as compared to the prior art processes.

Other and further objects, features and advantages of the present invention will be apparent from the description of presently preferred embodiments of the invention, given for the purpose of disclosure and taken in conjunction with the accompanying drawings.

BRIEF DESCRIPTION OF THE DRAWINGS

FIG. 1 is a diagrammatic view of a system which may be used for carrying out the vapor adsorption process of the present invention, and FIG. 2 is a diagrammatic view of an alternate system which may be used for carrying out the process of the present invention.

DESCRIPTION OF THE PREFERRED EMBODIMENTS

Referring now to the drawings, and particularly to FIG. 1, a system 10 for carrying out the cyclic vapor adsorption process of the present invention is illustrated. A multi-component feed gas stream, such as a natural gas or refinery gas stream is conducted to the system 10 by a conduit 12. The system 10 includes three vessels 14, 16 and 18, each of which contains a bed of solid adsorbent material.

Let it be assumed that the adsorbent bed contained within the vessel 14 is adsorbing adsorbable components from the feed gas stream. The feed gas stream flows through the conduit 12 into a feed gas inlet header 20. From the header 20 the feed gas is routed by way of valve 22 and conduit 28 into the vessel 14. During subsequent cycles, valves 24 and 26 and conduits 30 and 32 serve to conduct the feed gas stream to the vessels 16 and 18, respectively. In passing through the vessel 14, the feed gas stream contacts the solid adsorbent bed contained therein causing adsorbable components to be adsorbed on the bed and removed from the gas stream. The residue gas from the vessel 14 passes by way of conduit 34 and valve 40 into a main residue gas header 46. During subsequent cycles, the conduits 36 and 38 and valves 42 and 44 serve similarly to remove the residue gas stream from the vessels 16 and 18, respectively. The main residue gas stream is withdrawn from the header 46 by way of conduit 48 from where it is conducted to a point of further processing or use.

When the bed of adsorbent material within the vessel 14 becomes spent or loaded with adsorbed components, it is regenerated by passing through it a heated regeneration gas stream. Let it be assumed that the bed of adsorbent material within the vessel 16 is in the process of being heated and regenerated. A heated regeneration gas stream is passed from a regeneration gas inlet header 50 by way of conduit 54, valve 60 and conduit 30 into the vessel 16. Conduits 52, 28, 56 and 32, and valves 58 and 62 serve similarly to conduct the heated regeneration gas stream to vessels 14 and 18 when the adsorbent beds contained therein are regenerated. The heated regeneration gas stream flowing through the adsorbent bed contained within the vessel 16 heats the adsorbent material and causes components adsorbed thereon to be desorbed into the regeneration gas stream. The regeneration gas stream containing the desorbed components flows from the vessel 16 by way of conduit 36, valve 72 and conduit 66 into a regeneration gas outlet header 76. Conduits 34, 64 38 and 68, and valves 70 and 74 serve a similar purpose when the adsorbent beds contained within the vessels 14 and 18 are regenerated. From the regeneration gas outlet header 76, the regeneration gas stream containing desorbed adsorbable components is conducted by way of a conduit 78 to a regeneration gas stream inlet manifold connected to a pair of volume-temperature compensator vessels 80 and 82.

The use of volume-temperature compensators to minimize pressure and volume changes in regeneration gas and cooling gas circuits, and for conserving heat used in the regeneration and cooling of adsorbent beds is known. For example, U.S. Letters Pat. No. 3,405,507, issued Oct. 15, 1968 and assigned to the assignee of this application discloses the use of compensator zones in vapor adsorption systems. Normally, the compensator vessels are packed with a porous and permeable material of very low adsorptive capacity and high temperature stability. The quantity and volume of packing material used is dictated by the size and number of the main adsorbent beds and the type and quantity of adsorbent material used therein. That is, the void volume of each compensator is matched with the void volume of one of the main adsorbent beds. Suitable packing materials include metal turnings or shapes, glass fibers, glass spheres, crushed glass, quartz, certain volcanic rock and ceramics.

In accordance with the present invention, the volume-temperature compensator vessels 80 and 82 contain permeable packing material of the type described above, and in addition, the vessels contain selected adsorbent material having an affinity for undesirable or unselected adsorbable components. In the system 10, the adsorbent material is placed in the volume-temperature compensator vessels 80 and 82 in layers. That is, a layer of adsorbent material 84 is placed near the top of each of the vessels 80 and 82 with layers of packing material 86 above and below the adsorbent material.

The regeneration gas stream, rich in desorbed components, passes by way of conduit 78 into a compensator regeneration gas stream inlet header 84 which is connected to a pair of conduits 86 and 88. The conduits 86 and 88 are connected to the compensator vessels 80 and 82, respectively. A pair of valves 90 and 92 are disposed in the header 84.

Assuming that the compensator vessel 80 was heated by the cooling gas stream in the previous cycle, the regeneration gas stream is passed by way of valve 90 and conduit 86 into the compensator vessel 80. The valve 92 and conduit 88 serve similarly during subsequent cycles. As will be understood by those skilled in the art, the regeneration gas stream gives up its heat to the adsorbent bed being regenerated, and as a result it cools the material contained within the vessel 80. As the regeneration gas stream passes through the packing and adsorbent material contained in the vessel 80, the adsorbent material 84 adsorbs undesirable or unselected components from the regeneration gas stream so that a residual gas stream is produced containing only selected or desirable components. The residual regeneration gas stream passes from the vessel 80 by way of conduit 94 and valve 100, into a compensator regeneration gas outlet header 98. Conduit 96 and valve 102 serve a similar purpose when the regeneration gas stream is passed through the vessel 82. The regeneration gas stream containing selected adsorbable components is removed from the header 98 by way of a conduit 104, and is conducted to a conventional gas cooler 106 wherein the regeneration gas stream is cooled causing the selected adsorbable components to be condensed. From the cooler 106 the cooled regeneration gas stream and condensed components pass into a conventional vapor-liquid separator 108 wherein the condensed components are separated. The separated liquid components are withdrawn from the separator 108 by way of a conduit 110 having a conventional liquid level control valve 112 disposed therein. The remaining regeneration gas stream is passed by way of a conduit 114 to a conventional gas booster or compressor 116. From the gas booster 116 the regeneration gas stream is passed by way of conduit 118 to the heating coil 120 of a conventional gas heater 122, wherein the regeneration gas stream is heated. From the heater 122, the heated regeneration gas stream is conducted by way of a conduit 124 back to the heated regeneration gas stream inlet header 50. As will be apparent to those skilled in the art, the regeneration gas stream circuit described above is of the "closed" type. That is, it is not communicated with the other gas streams passing through the system 10, and the gas within the circuit is continuously circulated or recycled. This is contrasted with an "open" type of circuit wherein a portion of the feed gas or residue gas is caused to pass through the circuit in a once through manner.

When an adsorbent bed has been heated sufficiently to remove the adsorbed components therefrom it must be cooled before it can again contact the feed gas stream. Let it be assumed that the adsorbent bed contained within the vessel 18 is being cooled. As shown in FIG. 1, the cooling gas circuit of the system 10 is of the open type, and the source of cooling gas is part or all of the main residue gas stream flowing through the main residue gas outlet header 46. A conduit 130 connects the main residue gas outlet header 46 to a cooling gas stream inlet header 132. The cooling gas stream is routed by way of conduit 138, valve 144, and conduit 32 into adsorbent bed vessel 18. Conduits 134, 28, 136 and 30, and valves 140 and 142 serve similar purposes when the adsorbent beds within the vessels 14 and 16 are being cooled. As the cooling gas stream flows through the adsorbent bed within the vessel 18, the adsorbent bed is cooled, and the cooling gas stream is heated. The heated cooling gas stream exits the vessel 18 by way of conduit 38, valve 156 and conduit 150 into a cooling gas stream outlet header 158. Conduits 34, 146, 36 and 148, and valves 152 and 154 serve similar purposes when the adsorbent beds within the vessels 14 and 16 are cooled. From the header 158 the heated cooling gas stream passes by way of a conduit 160 to a compensator cooling gas inlet header 162. The ends of the header 162 are attached to the conduits 86 and 88 and valves 164 and 166 are disposed in the header 162.

Assuming that the volume-temperature compensator bed within the vessel 82 was contacted by the regeneration gas stream in the previous cycle, the heated cooling gas stream is routed by way of the header 162, valve 166 and conduit 88 into the vessel 82. Valve 164 and conduit 86 serve similarly when the cooling gas stream is passed through vessel 80. As the cooling gas stream passes through the vessel 82 and contacts the adsorbent material and packing material contained therein, the materials are heated and unselected or undesirable components adsorbed on the adsorbent material during the previous cycle are desorbed therefrom into the cooling gas stream. The cooling gas stream rich in the unselected components exits the vessel 82 by way of conduit 96 which is attached to a compensator cooling gas stream outlet header 170 having a pair of valves 172 and 174 disposed therein. The cooling gas stream passes by way of conduit 96, valve 174 and header 170 into a conduit 176. During cycles wherein the cooling gas stream is passed through the vessel 80, conduit 94 and valve 172 serve a similar purpose. The conduit 176 is connected to the main residue gas outlet header 46 so that the cooling gas stream combines with the residue gas passing through the header 46 and is conducted from the system 10 by way of conduit 48. As will be understood, conventional controls are provided in the system 10 (not shown) to cause a controlled flow rate of residue gas to flow through the cooling gas circuit.

Thus, by the process of the present invention as carried out in the system 10, selected adsorbable components are recovered from the feed gas stream substantially free of unselected or undesired adsorbable components which are caused to exit from the system 10 with the main residue gas stream.

As will be apparent from the foregoing description of the system 10, three circuits are provided, i.e., a feed gas stream adsorption circuit, a regeneration gas stream circuit which is of the closed type, and a cooling gas stream circuit which is of the open type. The circuits are continuously cycled so that the main adsorbent bed just contacted with the feed gas stream is contacted with the regeneration gas stream, the main adsorbent bed just contacted with the cooling gas stream is contacted with the feed gas stream, the main adsorbent bed just contacted with the regeneration gas stream is contacted with the cooling gas stream, the regeneration gas stream is passed through the compensator zone just heated and the cooling gas stream is passed through the compensator zone just cooled. In addition, a purging step may be included in the process to purge regeneration gas rich in adsorbable components from the adsorbent bed and associated compensator zone just contacted with the regeneration gas stream prior to contacte with the cooling gas stream thereby preventing preloading of the cooled adsorbent bed.

In addition to the gas stream cooler 106 and gas stream heater 122, various heat exchangers (not shown) may be utilized in the system 10 for conserving heat and increasing heat efficiency. For example, the cool regeneration gas stream leaving the gas booster 116 may be heat exchanged with the hot regeneration gas stream upstream of the gas cooler 106 thereby preheating the regeneration gas stream prior to when it enters the gas heater 122 and precooling the regeneration gas stream prior to when it enters the gas cooler 106.

The continuous cycling of the feed gas, regeneration gas and cooling gas circuits is accomplished by means of a conventional cycle controller well known to those skilled in the art which automatically opens and closes the valves of the system 10 on a periodic basis.

Examples of multi-component feed gas streams which may be processed in accordance with the present invention are natural gas streams and refinery gas streams. Assuming that a natural gas stream containing adsorbable components comprised of hydrocarbon compounds, hydrogen sulfide and carbon dioxide is being processed in the system 10, the selected or desirable components are the hydrocarbon compounds with the unselected components being hydrogen sulfide and carbon dioxide. In this case, the adsorbent material contained within the adsorbent bed vessels 14, 16 and 18 may be activated charcoal and the adsorbent material contained within the volume-temperature compensator vessels 80 and 82 may be synthetic zeolite. All of the components contained in the feed gas stream, namely hydrocarbon compounds, hydrogen sulfide and carbon dioxide are adsorbable and are adsorbed, at least in part, by the activated charcoal. The synthetic zeolite selectively adsorbs the hydrogen sulfide and carbon dioxide from the regeneration gas stream so that a product stream comprised of hydrocarbon compounds is recovered substantially free of the unselected compounds. As will be readily apparent to those skilled in the art, by utilizing various adsorbent materials in the system 10, the process of the present invention may be used to recover a variety of selected adsorbable components from multi-component gas streams substantially free of a variety of unselected adsorbable components.

Referring now to FIG. 2, an alternate system 180, which may be used for carrying out the process of the present invention is illustrated in diagrammatic form. The system 180 includes three adsorbent beds contained within vessels 182, 184 and 186. A multi-component feed gas stream is conducted to the system 180 by way of a conduit 188. The conduit 188 is connected to a feed gas inlet header 190 from where the feed gas stream is routed to one of the adsorbent bed vessels 182, 184 or 186.

Let it be assumed that the adsorbent bed contained within the vessel 182 is adsorbing adsorbable components contained in the feed gas stream. The feed gas stream flows from the header 190 into the vessel 182 by way of valve 192 and conduit 198. Valves 194 and 196 and conduits 200 and 202 serve similar purposes when the adsorbent beds contained within the vessels 184 and 186 are contacted with the feed gas stream. As the feed gas stream passes through the vessel 182, it contacts the adsorbent material contained therein causing adsorbable components to be adsorbed and removed from the gas stream. The residue gas stream from the vessel 182 passes through conduit 204 and valve 210 into a main residue gas outlet header 216. Conduits 206 and 208 and valves 212 and 214 serve similarly during subsequent cycles to remove the main residue gas stream from vessels 184 and 186. The main residue gas stream is withdrawn from the system 180 by a conduit 218 connected to the header 216 from where it is passed to a point of further processing or use.

When the bed of adsorbent material within the vessel 182 becomes spent or loaded with adsorbable components, it is regenerated by a heated regeneration gas stream. Let it be assumed that the bed of adsorbent material within the vessel 184 is being regenerated. A heated regeneration gas stream is passed from a regeneration gas stream inlet header 220 to the vessel 184 by way of conduit 226, valve 232 and conduit 200. During subsequent cycles, conduits 224, 198, 228 and 202, and valves 230 and 234 serve similar purposes. The heated regeneration gas stream passes through the adsorbent bed contained within the vessel 184, heating the adsorbent material, and causing adsorbable components adsorbed thereon to be desorbed into the regeneration gas stream. The regeneration gas stream containing the desorbed components flows from the vessel 184 by way of conduit 206, valve 244 and conduit 238 into a regeneration gas outlet header 248. During subsequent cycles conduits 204, 236, 208 and 240, and valves 242 and 246 serve similar purposes. The regeneration gas stream which has given up heat to the adsorbent bed contained within the vessel 184 is conducted by a conduit 250 connected to the header 248 to a conventional gas stream cooler 252. While passing through the cooler 252 the regeneration gas stream is further cooled and condensible adsorbable components contained therein are condensed. The regeneration gas stream and condensed components pass by way of conduit 254 into a conventional vapor-liquid separator 256 wherein the condensed liquids are separated from the regeneration gas stream. These liquids are withdrawn from the separator 256 by way of a conduit 258 having a conventional liquid level control valve 260 disposed therein.

The regeneration gas stream is withdrawn from the separator 256 by way of a conduit 262 which leads into a conventional gas compressor or booster 264. From the gas booster 264 the regeneration gas stream passes by way of the conduit 266 to a compensator regeneration gas inlet header 268 having valves 270 and 272 disposed therein. The ends of the header 268 are connected to a pair of conduits 274 and 276 which are in turn connected to a pair of volume-temperature compensator vessels 278 and 280.

The volume-temperature compensators 278 and 280 are similar to the compensators 80 and 82 described above for the system 10, and serve to minimize pressure and volume changes in the regeneration gas and cooling gas circuits, and to conserve heat, and for adsorbing undesirable or unselected components from the regeneration gas stream. However, instead of the adsorbent material and packing material being in layers as described above for the system 10, special internal vessels for containing the adsorbent material are disposed within the compensator vessels 278 and 280. Specifically, the compensator vessels 278 and 280 include internal vessels 282 and 284 respectively. The internal vessels 282 and 284 are open ended at the top and closed at the bottom, and conduits 286 and 288 which pass through the walls of the vessels 278 and 280 are connected to the bottom ends of the internal vessels 282 and 284, respectively. A selected adsorbent material 281 is placed within the internal vessels 282 and 284, and conventional packing material 283 of low adsorptive capacity and high temperature stability is placed within the vessels 278 and 280 in the annular areas between the walls of the internal vessels 282 and 284 and the walls of the vessels 278 and 280.

The regeneration gas stream, rich in adsorbable components, passes from the header 268 by way of valve 270 and conduit 274 into the compensator vessel 278. During subsequent cycles when the regeneration gas stream is passed into the vessel 280, the valve 272 and conduit 276 serve a similar purpose. A portion of the regeneration gas stream is caused to pass through the adsorbent material contained within the internal vessel 282 and is removed therefrom by way of conduit 286. The remaining portion of the regeneration gas stream passes through the packing material contained within the compensator vessel 282 and is withdrawn by way of a conduit 290 connected to the vessel 278. Conduits 292 and 288 serve similarly for the compensator vessel 280 and internal vessel 284.

Assuming that the cooling gas stream has passed through the compensator vessel 278 in the previous cycle causing the adsorbent and packing materials therein to be heated, as the regeneration gas stream passes through the vessel 278 the adsorbent and packing materials are cooled. The portion of the regeneration gas stream which is caused to pass through the adsorbent material contained within the internal vessel 282 cools the adsorbent material, and unselected components contained therein are adsorbed. Thus, the portion of the regeneration gas stream withdrawn from the internal vessel 282 by way of the conduit 286 contains selected components substantially free of the adsorbed unselected components. This product stream passes by way of conduit 286, valve 294 and conduit 298 to a header 302. Conduits 286 and 356, valve 296 and conduit 300 serve a similar purpose when the regeneration gas stream is passed through the compensator vessel 280. From the header 302 the selected component product stream is withdrawn from the system 180 for further processing or use. The portion of the regeneration gas stream not caused to pass through the internal vessel 282 passes through the packing material contained within the vessel 278 and is withdrawn therefrom by way of conduit 290. A compensator regeneration gas outlet header 304 is provided attached to the conduits 290 and 292, and having valves 306 and 308 disposed therein. The regeneration gas stream passes by way of valve 306, the header 304 and a conduit 310 connected thereto to the heating coil 312 of a conventional gas heater 314. While passing through the heater 314 the regeneration gas stream is heated to a desired temperature level, and then is passed by way of conduit 316 back to the regeneration gas stream inlet header 220.

Assuming that the adsorbent bed contained within the vessel 186 is being cooled, a cooling gas stream is passed into a cooling gas stream inlet header 318. From the header 318 the cooling gas stream passes by way of conduit 324, valve 330 and conduit 202 into the vessel 186. Conduits 320, 322, 198 and 200 and valves 326 and 328 serve similar purposes in subsequent cycles when the beds within the vessels 182 and 184 are being cooled. As the cooling gas stream flows through the adsorbent bed within the vessel 186, the adsorbent material contained therein is cooled, and the cooling gas stream is heated. The heated cooling gas stream exits the vessel 186 by way of conduit 208, valve 344 and conduit 338 and passes into a cooling gas stream outlet header 332. During subsequent cycles, the conduits 204, 206, 334 and 336 and valves 340 and 342 serve similar purposes. From the cooling gas stream outlet header 332 the heated cooling gas stream passes by way of conduit 346 into a compensator cooling gas stream inlet header 348. A pair of valves 350 and 352 are provided in the header 348, and the ends of the header 348 are connected to the conduits 274 and 276. The cooling gas stream passes by way of the header 348, the valve 352 and the conduit 276 into the volume-temperature compensator 280. The valve 350 and conduit 274 serve similarly when the cooling gas stream is passed into the vessel 278. As the heated cooling gas stream passes through the vessel 280, the packing material and adsorbent material contained therein are heated. A portion of the cooling gas stream is caused to pass through the adsorbent material contained within the internal vessel 284, heating the adsorbent material and causing unselected components to be desorbed therefrom. The resulting stream, rich in desorbed unselected components is withdrawn from the internal vessel 284 by way of conduit 288, valve 360 and conduit 368. The conduit 368 is attached to a header 362. During subsequent cycles, the conduit 286, conduit 354 and valve 358 serve similarly to remove the unselected component stream from the internal vessel 282 contained within the compensator 278. From the header 362 the unselected component stream may either be withdrawn from the system 180 by way of a conduit 364 or passed to the main residue gas outlet header 216 by way of a conduit 366.

As will be understood by those skilled in the art, the portions of the regeneration gas and cooling gas streams caused to pass through the internal vessels 282 and 284 of the compensators 278 and 280 are controlled by conventional flow control instruments (not shown). The pressure of the product stream header 302 may be maintained at a lower level than the regeneration gas stream thereby providing the driving force required for withdrawing the selected component product stream, or a conventional gas booster may be used. If the stream rich in unselected components is combined with the main residue gas stream, a gas booster may be used, or an additional pressure drop may be imposed on the main residue gas stream ahead of the point where the stream rich in unselected components joins the main residue gas stream.

The portion of the cooling gas stream not caused to pass through the internal vessel 284 is passed through the packing material contained within the compensator 280, and is withdrawn from the compensator 280 by way of conduit 292. The conduit 292 is connected to a compensator cooling gas outlet header 370 having a pair of valves 372 and 374 disposed therein. The cooling gas stream passes by way of conduit 292, and valve 374 into header 370. During subsequent cycles, conduit 290 and valve 372 serve similarly. A conduit 376 attached to the header 370 leads the cooling gas stream to a conventional gas stream cooler 378. From the gas stream cooler 378 the cooling gas stream is conducted to a gas compressor or booster 380 from where it passes by way of conduit 382 back to the cooling gas inlet header 318.

As will be apparent from the above description of the system 180, the regeneration gas and cooling gas stream circuits are of the closed type. As described above for the system 10, the system 180 includes a feed gas adsorption circuit, a regeneration gas stream circuit and a cooling gas stream circuit. These circuits are cycled periodically in the same manner as described above for the system 10. In addition, a purge step may be incorporated in the process to remove adsorbable components remaining in the bed just heated prior to the cooling thereof to prevent preloading of the cooling bed.

By the present invention as carried out in the system 180, a selected component product stream is recovered from a multi-component feed gas stream, and a stream rich in unselected adsorbable components may either be recovered separately for further processing or use, or combined with the main residue gas stream. By proper selection of the adsorbent materials utilized in the system 180, a variety of product streams may be produced. For example, if a natural gas stream is processed and a hydrocarbon product stream comprised primarily of "light hydrocarbons," i.e., methane and ethane, but devoid of hydrogen sulfide, carbon dioxide and water is desired, an adsorbent material such as synthetic zeolite having an affinity for hydrogen sulfide, carbon dioxide and water may be utilized in the vessels 282 and 284 within the compensators 278 and 280. An adsorbent material such as activated charcoal may be utilized in the adsorbent bed vessels 182, 184 and 186. A major portion of the "heavy hydrocarbon" components, namely propane, butane, pentane, etc., desorbed into the regeneration gas stream will be condensed in the cooler 252 and removed in liquid form from the separator 256. The hydrogen sulfide, carbon dioxide and water will be removed from the portion of the regeneration gas stream passed through the compensator adsorbent material and a product stream comprised primarily of light hydrocarbons substantially free of hydrogen sulfide, carbon dioxide and water will be produced. Simultaneously, a stream rich in hydrogen sulfide, carbon dioxide and water will be produced, which stream may be withdrawn from the system 180 or combined with the main residue gas stream as desired. If the feed gas stream is natural gas which does not contain polar compounds and activated charcoal is substituted for the synthetic zeolite, a selected component product stream comprised of light hydrocarbons essentially free of heavy hydrocarbons will be produced.

In order to present a clear understanding of the present invention, the adsorbent bed, compensator zone and valve sequences for the systems 10 and 180 through three complete cycles are presented in Tables I and II below:

TABLE I

Adsorbent Bed, Compensator Zone and Valve Sequence for the System 10

| Vessel or Valve No. | First Cycle | Second Cycle | Third Cycle |
|---|---|---|---|
| Adsorbent Bed Vessel | | | |
| 14 | Adsorbing | Heating | Cooling |
| 16 | Heating | Cooling | Adsorbing |
| 18 | Cooling | Adsorbing | Heating |
| Compensator Zone Vessel | | | |
| 80 | Cooling[1] | Heating[2] | Cooling[1] |
| 82 | Heating[2] | Cooling[1] | Heating[2] |
| Valve | | | |
| 22 | Open | Closed | Closed |
| 24 | Closed | Closed | Open |
| 26 | Closed | Open | Closed |
| 40 | Open | Closed | Closed |
| 42 | Closed | Closed | Open |
| 44 | Closed | Open | Closed |
| 58 | Closed | Open | Closed |
| 60 | Open | Closed | Closed |
| 62 | Closed | Closed | Open |
| 70 | Closed | Open | Closed |
| 72 | Open | Closed | Closed |
| 74 | Closed | Closed | Open |
| 90 | Open | Closed | Open |
| 92 | Closed | Open | Closed |
| 100 | Open | Closed | Open |
| 102 | Closed | Open | Closed |
| 140 | Closed | Closed | Open |
| 142 | Closed | Open | Closed |
| 144 | Open | Closed | Closed |
| 152 | Closed | Closed | Open |
| 154 | Closed | Open | Closed |
| 156 | Open | Closed | Closed |
| 164 | Closed | Open | Closed |
| 166 | Open | Closed | Open |
| 172 | Closed | Open | Closed |
| 174 | Open | Closed | Open |

[1]Adsorbent material in compensator vessel adsorbing unselected components
[2]Adsorbent material in compensator vessel desorbing unselected components

TABLE II

Adsorbent Bed, Compensator Zone and Valve Sequence for the System 180

| Vessel or Valve No. | First Cycle | Second Cycle | Third Cycle |
|---|---|---|---|
| Adsorbent Bed Vessel | | | |
| 182 | Adsorbing | Heating | Cooling |
| 184 | Heating | Cooling | Adsorbing |
| 186 | Cooling | Adsorbing | Heating |
| Compensator Zone Vessel | | | |
| 278 | Cooling[1] | Heating[2] | Cooling[1] |
| 280 | Heating[2] | Cooling[1] | Heating[2] |
| Valve | | | |
| 192 | Open | Closed | Closed |
| 194 | Closed | Closed | Open |
| 196 | Closed | Open | Closed |
| 210 | Open | Closed | Closed |
| 212 | Closed | Closed | Open |

| | | | |
|---|---|---|---|
| 214 | Closed | Open | Closed |
| 230 | Closed | Open | Closed |
| 232 | Open | Closed | Closed |
| 234 | Closed | Closed | Open |
| 242 | Closed | Open | Closed |
| 244 | Open | Closed | Closed |
| 246 | Closed | Closed | Open |
| 270 | Open | Closed | Open |
| 272 | Closed | Open | Closed |
| 306 | Open | Closed | Open |
| 308 | Closed | Open | Closed |
| 326 | Closed | Closed | Open |
| 328 | Closed | Open | Closed |
| 330 | Open | Closed | Closed |
| 340 | Closed | Closed | Open |
| 342 | Closed | Open | Closed |
| 344 | Open | Closed | Closed |
| 350 | Closed | Open | Closed |
| 352 | Open | Closed | Open |
| 372 | Closed | Open | Closed |
| 374 | Open | Closed | Open |
| 294 | Open | Closed | Open |
| 296 | Closed | Open | Closed |
| 358 | Closed | Open | Closed |
| 360 | Open | Closed | Open |

[1]Adsorbent material in compensator vessel adsorbing unselected components
[2]Adsorbent material in compensator vessel desorbing unselected components The following examples further illustrate the present invention.

EXAMPLE 1

A multi-component natural gas stream of the composition given in Table III below is processed in the system 180:

TABLE III

Feed Gas Composition

| Component | Concentration (Mol Percent) |
|---|---|
| Nitrogen | 0.02 |
| Carbon Dioxide | 0.24 |
| Methane | 93.52 |
| Ethane | 3.85 |
| Propane | 1.22 |
| Isobutane | 0.41 |
| Butane | 0.24 |
| Isopentane | 0.12 |
| Pentane | 0.07 |
| Hexane and Heavier | 0.21 |
| TOTAL | 100.00 |

It is desired to recover ethane and heavier hydrocarbon components substantially free of carbon dioxide from the feed gas stream, and the adsorbent bed vessels 14, 16 and 18 contain an adsorbent material such as activated charcoal.

For feed gas stream conditions of 600 psia and 100° F, the percent of each component adsorbed by the activated charcoal and the composition of the portion of the feed gas stream adsorbed is that shown in Table IV below.

TABLE IV

Adsorbed Components

| Component | Percent of Feed Adsorbed | Concentration (Mol Percent) |
|---|---|---|
| Nitrogen | 1.6 | 0.01 |
| Carbon Dioxide | 26.0 | 0.51 |
| Methane | 6.5 | 49.57 |
| Ethane | 100.0 | 31.40 |
| Propane | 100.0 | 9.95 |
| Isobutane | 100.0 | 3.34 |
| Butane | 100.0 | 1.96 |
| Isopentane | 100.0 | 0.98 |
| Pentane | 100.0 | 0.57 |
| Hexane and Heavier | 100.0 | 1.71 |

The regeneration gas stream entering the separator 256 at a pressure of 600 psia and a temperature of 100° F (the outlet temperature from gas cooler 252) is predominantly vapor. Some liquid, about 1.1 mols for every 100 mols of feed gas processed during the adsorption step is removed in the separator 256. The composition of the coexisting liquid and vapor phases in the separator 252 and the amount of each is given below in Table V.

TABLE V

Composition and Relative Amounts of Vapor and Liquid Phases in Separator 256

| Component | Liquid Phase (Mol Percent) | Vapor Phase (Mol Percent) |
|---|---|---|
| Nitrogen | 0.0 | 0.01 |
| Carbon Dioxide | 0.22 | 0.54 |
| Methane | 8.07 | 53.76 |
| Ethane | 26.17 | 31.93 |
| Propane and Heavier | 65.54 | 13.76 |
| Amount (mols/100 mols feed gas) | 100.00 1.1 | 100.00 11.1 (Excluding Recycle) |

CONVENTIONAL PROCESS

For a conventional process the composition of the vapor product stream is the composition of the vapor phase in separator 256 given in Table V. Thus, the product stream of the conventional process is contaminated with 0.54 mol percent of the carbon dioxide.

THE PRESENT INVENTION

In accordance with the present invention, the internal vessels 282 and 284 of the compensators 278 and 280 contain adsorbent material having an affinity for carbon dioxide, such as a commercially available material marketed under the trade designation "molecular sieve type 4A." At the average conditions over the cycle existing in the compensator vessels 278 and 280 when contacted with the regeneration gas stream, i.e., 600 psia and 200° F, the equilibrium loading of the adsorbent material, for the gas composition shown, is that given in Table VI below.

TABLE VI

Loading of Molecular Sieve, Type 4A Adsorbent

| Component | Vapor Phase (Mol Percent) | Adsorbed Phase (lb/100 lb Adsorbent) |
|---|---|---|
| Nitrogen | 1.19 | 0.00 |
| Carbon Dioxide | 0.56 | 0.30 |
| Methane | 55.78 | 1.50 |
| Ethane | 32.92 | 1.70 |
| Propane and Heavier | 9.55 | 0.70 |
| Total | 100.00 | |

Since the capacity of the molecular sieve for carbon dioxide at 600 psia and 200°13.76

0.3 pounds 100.00 carbon dioxide per 100 pounds of molecular sieve, the minimum quantity of molecular sieve required gas) calculated as follows:

lbs of CO₂ to be removed = (44 lb/lb mol)/(11.1 lb mols/100 mols feed gas × 0.0054 (from Table V)

= 2.64 lb/100 mols feed gas.

lbs molecular sieve required = (2.64 lb CO₂/100 mols feed gas)/(0.30 lb CO₂/100 lb molecular sieve)

= 880 lbs molecular sieve/100 mols feed gas

For this amount of molecular sieve the composition of the product gas withdrawn from the adsorbent beds contained within the compensator zones of the system 180 is that given in Table VII.

TABLE VII

Selected Component Product Stream Analysis

| Component | Composition (Mol Percent) |
| --- | --- |
| Nitrogen | 0.01 |
| Carbon Dioxide | 0.00 |
| Methane | 55.00 |
| Ethane | 28.00 |
| Propane and Heavier | 16.99 |
| Total: | 100.00 |

Thus, by the present invention, a selected component product stream, free of unselected components (carbon dioxide) is produced.

EXAMPLE 2

A 20 mmscf/day natural gas stream of the composition given in Table VIII and at inlet conditions of 400 psia and 80° F is processed by the system 10 illustrated in FIG. 1 with the selected components being adsorbable hydrocarbon compounds and the unselected component being hydrogen sulfide.

TABLE VIII

Composition of Inlet Natural Gas Stream

| Component | Concentration (Mol Percent) |
| --- | --- |
| Nitrogen | 2.0 |
| Hydrogen Sulfide | 1.0 |
| Methane | 87.0 |
| Ethane | 4.0 |
| Propane | 4.0 |
| Isobutane | 1.0 |
| Butane | 1.0 |
| Total: | 100.00 |

30,000 pounds of activated carbon adsorbent material is contained in each of the adsorbent bed vessels 14, 16 and 18, and 10,000 pounds of synthetic zeolite adsorbent material and 40,000 pounds of packing material are contained in each of the volume temperature compensator vessels 80 and 82. A cycle time of 20 minutes is used.

At the beginning of a first cycle as shown in Table I, the feed gas contacts the adsorbent bed contained in the vessel 14, producing a 17.5 mmscf/day main residue gas stream.

The adsorbent bed contained within the vessel 16 is regenerated with a 20 mmscf/day regeneration gas stream entering the vessel 16 at a temperature of 650° F. The regeneration gas stream exiting from the vessel 16 is initially at a temperature of 100° F and reaches a maximum temperature of 400° F.

The adsorbent material and packing material contained within the vessel 80 is cooled to an average temperature of 300° F by the regeneration gas stream passing therethrough, and the hydrogen sulfide desorbed from the adsorbent bed contained within the vessel 16 is adsorbed on the adsorbent material contained in the vessel 80. A 22.5 mmscf/day stream of regeneration gas containing selected components, i.e., hydrocarbon components, exits the vessel 80 and is cooled to a temperature of 110° F as it passes through the gas cooler 106. 40,000 gallons/day of hydrocarbon components are condensed in the cooler 106 and removed from the separator 108. The remaining regeneration gas stream (20 mmscf/day) at a temperature of 110° F is passed to the gas heater 122 where it is heated to a temperature level of 650° F.

A 15 mmscf/day cooling gas stream is passed through the adsorbent bed contained within the vessel 18, and the cooling gas stream exits the vessel 18 at an initial temperature of 400° F, reaching a maximum temperature of 600° F. The cooling gas stream passes through the packing and adsorbent material contained within the vessel 82 heating the material to an average temperature of 600° F thereby causing the hydrogen sulfide previously adsorbed on the adsorbent material to be desorbed into the cooling gas stream. A 15.3 mmscf/day stream, rich in hydrogen sulfide exits the vessel 82 at an average temperature of 120° F, and combines with the main residue gas stream withdrawn from the system.

EXAMPLE 3

A 100 mmscf/day natural gas stream of the composition given in Table IX and at inlet conditions of 600 psia and 100° F is processed by the system 180 shown in FIG. 2 with the selected components being hydrocarbon compounds and the unselected component being hydrogen sulfide.

TABLE IX

Composition of Inlet Natural Gas Stream

| Component | Concentration Mol Percent |
| --- | --- |
| Hydrogen Sulfide | 0.32 |
| Methane | 93.50 |
| Ethane | 3.91 |
| Propane | 1.22 |
| Isobutane | 0.32 |
| Butane | 0.33 |
| Isopentane | 0.12 |
| Pentane | 0.07 |
| Hexane + | 0.21 |
| Total: | 100.00 |

80,000 pounds of activated carbon adsorbent material are contained in each of the vessels 182, 184 and 186 and a cycle time of 15 minutes is used.

During a first cycle as shown in Table II, the feed gas stream contacts the adsorbent bed contained within the vessel 182, and a 90 mmscf/day residue gas stream is produced which is withdrawn from the system 180 by way of the conduit 218.

The adsorbent bed contained within the vessel 184 is contacted with a 80 mmscf/day regeneration gas stream at a temperature of 650° F. The regeneration gas stream containing desorbed components exits the vessel 184 at an initial temperature of 175° F, reaching a maximum temperature of 375° F. The regeneration gas stream is cooled to a temperature of 110° F by the gas cooler 252 resulting in about 50,000 gallons/day of condensed liquid which is removed from the separator 256. Each of the compensators 278 and 280 contain 10,000 pounds of synthetic zeolite adsorbent material and 140,000 pounds of quartz packing material. The regeneration gas stream at a temperature of 110° F passes into the vessel 278, and a 10 mmscf/day portion thereof is caused to pass through the adsorbent material contained within the vessel 282 so that hydrogen sulfide contained therein is adsorbed on the adsorbent material. A 9.8 mmscf/day product stream substantially free of hydrogen sulfide is removed from the vessel 282 at an average temperature of about 200° F. The remaining portion of the regeneration gas stream (80 mmscf/day) is passed by way of conduit 310 to the gas heater 314 where it is heated to a temperature of 650° F and then recycled back to the adsorbent bed contained within the vessel 184.

A 100 mmscf/day stream of cooling gas is passed into the vessel 186 at a temperature of 110° F. The cooling gas stream initially exiting the vessel 186 is at a temperature of 370° F and reaches a maximum temperature of 600° F. This stream is passed through the packing material and adsorbent material contained within the vessel 280 heating the material to an average temperature of 500° F. A 7 mmscf/day portion of the cooling gas stream is passed through the adsorbent material contained within the vessel 284 causing hydrogen sulfide previously adsorbed thereon to be desorbed. The remaining cooling gas stream amounting to 93 mmscf/day at an average temperature of 125° F is passed by way of conduit 382 back to the vessel 186.

The present invention, therefore, is well adapted to carry out the objects and attain the advantages mentioned as well as those inherent therein. While specific systems for carrying out the invention have been described for the purpose of disclosure, a variety of systems may be used for carrying out the invention. In addition, numerous changes in the process of the present invention can be made which will readily suggest themselves to those skilled in the art and which are encompassed within the spirit of the invention disclosed and claimed herein.

What is claimed is:

1. A vapor adsorption process for recovering selected adsorbable components from a multi-component feed gas stream comprising the steps of:
   a. contacting at least one of a plurality of main solid adsorbent beds with said feed gas stream so that adsorbable components contained therein are adsorbed on said bed;
   b. simultaneously contacting at least another of said main adsorbent beds which has previously adsorbed adsorbable components from said feed gas stream with a heated regeneration gas stream so that said components are desorbed from said bed into said regeneration gas stream;
   c. passing said regeneration gas stream from (b) into a previously heated compensator zone containing adsorbent material which has an affinity for unselected adsorbable components so that said zone is cooled, unselected adsorbable components contained in said regeneration gas stream are adsorbed on said adsorbent material, volumetric changes in said regeneration gas stream are compensated for, and a residual regeneration gas stream containing selected adsorbable components is produced;
   d. recovering the selected adsorbable components from said residual regeneration gas stream of (c);
   e. simultaneously contacting yet at least another of said plurality of main adsorbent beds with a cooling gas stream so that said bed is cooled preparatory to being contacted with said feed gas stream;
   f. passing said cooling gas stream into a previously cooled compensator zone containing adsorbent material which has an affinity for unselected adsorbable components so that said zone is heated, unselected adsorbable components are desorbed from said adsorbent material into said cooling gas stream and volumetric changes in said cooling gas stream are compensated for; and
   g. cycling said feed gas, regeneration gas and cooling gas streams so that the main adsorbent bed just contacted with said feed gas stream is contacted with said regeneration gas stream, the main adsorbent bed just contacted with said cooling gas stream is contacted with said feed gas stream, the main adsorbent bed just contacted with said regeneration gas stream is contacted with said cooling gas stream, the regeneration gas stream is passed through the compensator zone just heated and the cooling gas stream is passed through the compensator zone just cooled.

2. The process of claim 1 wherein the step of recovering the selected components from the regeneration gas stream of (c) comprises:
   cooling said regeneration gas stream so that selected adsorbable components contained therein are condensed; and
   separating and withdrawing said condensed selected components from said regeneration gas stream.

3. The process of claim 2 wherein the feed gas stream is natural gas, the selected adsorbable components are heavy hydrocarbons contained therein and the unselected adsorbable components are light hydrocarbons contained therein.

4. The process of claim 2 wherein the feed gas stream is natural gas, the selected adsorbable components are heavy hydrocarbons contained therein and the unselected adsorbable components are hydrogen sulfide, carbon dioxide and water contained therein.

5. The process of claim 2 wherein the feed gas stream is refinery gas, the selected adsorbable components are hydrocarbons contained therein and the unselected adsorbable components are sulfur dioxide and ammonia contained therein.

6. A vapor adsorption process for recovering selected adsorbable components from a multi-component feed gas stream comprising the steps of:
   a. contacting at least one of a plurality of main solid adsorbent beds with said feed gas stream so that adsorbable components contained therein are adsorbed on said bed and a main residue gas stream substantially free of adsorbable components is produced;

b. simultaneously contacting at least another of said main adsorbent beds which has previously adsorbed adsorbable components from said feed gas stream with a heated regeneration gas stream so that said adsorbable components are desorbed from said bed into said regeneration gas stream;

c. passing said regeneration gas stream of (b) containing desorbed components into a previously heated compensator zone so that said zone is cooled and volumetric changes in said regeneration gas stream are compensated for;

d. contacting a solid adsorbent bed maintained within said compensator zone and having an affinity for unselected adsorbable components with a portion of the regeneration gas stream of (c) so that unselected components contained therein are adsorbed on said bed and a residual product gas stream comprised of selected components is produced;

e. withdrawing said product gas stream comprised of selected components from said process;

f. simultaneously contacting yet at least another of said plurality of main adsorbent beds with a cooling gas stream so that said bed is cooled preparatory to being contacted with said feed gas stream;

g. passing said cooling gas stream into a previously cooled compensator zone so that said zone is heated and volumetric changes in said cooling gas stream are compensated for;

h. contacting a solid adsorbent bed maintained within said compensator zone with a portion of the cooling gas stream of (g) so that unselected components previously adsorbed thereon are desorbed therefrom and a stream rich in said unselected adsorbable components is produced; and i. cycling said feed gas, regeneration gas and cooling gas streams so that the main adsorbent bed just contacted with said feed gas stream is contacted with said regeneration gas stream, the main adsorbent bed just contacted with said cooling gas stream is contacted with said feed gas stream, the main adsorbent bed just contacted with said regeneration gas stream is contacted with said cooling gas stream, the regeneration gas stream is passed through the compensator zone just heated by the cooling gas stream, the cooling gas stream is passed through the compensator zone just cooled by the regeneration gas stream, a portion of the regeneration gas stream contacts the solid adsorbent bed maintained within the compensator zone just heated thereby producing a residual product gas stream of selected adsorbable components and a portion of the cooling gas stream contacts the solid adsorbent bed maintained within the compensator zone just cooled thereby producing a stream rich in unselected adsorbable components.

7. The process of claim 6 which is further characterized to include the steps of:

cooling the regeneration gas stream of (b) containing desorbed components so that a portion of said desorbed components are condensed; and separating and withdrawing said condensed components from said regeneration gas stream prior to step (c).

8. The process of claim 7 wherein said stream rich in unselected components is withdrawn from said process.

9. The process of claim 7 wherein said stream rich in unselected components is combined with said main residue gas stream.

10. The process of claim 6 wherein the feed gas stream is natural gas, the selected adsorbable components are light hydrocarbons contained therein and the unselected adsorbable components are heavy hydrocarbons contained therein.

11. The process of claim 7 wherein the feed gas stream is natural gas, the selected adsorbable components are hydrocarbons contained therein and the unselected adsorbable components are carbon dioxide and water contained therein.

12. The process of claim 7 wherein the feed gas stream is natural gas, the selected adsorbable components are hydrocarbons contained therein and the unselected adsorbable components are hydrogen sulfide and water contained therein.

13. In a continuous cyclic vapor adsorption process wherein each of a plurality of adsorbent beds is contacted with a multi-component feed gas stream so that adsorbable components contained therein are adsorbed on the bed and a residue gas stream substantially free of said adsorbable components is produced, then contacted with a regeneration gas stream so that said adsorbable components are desorbed therefrom, and then contacted with a cooling gas stream so that said bed is cooled preparatory to again contacting said feed gas stream, said process including a pair of compensator zones to compensate for volumetric and temperature changes in said regeneration gas and cooling gas streams, which zones are alternately connected into the cooling and regeneration gas stream circuits downstream of said adsorbent beds during each cycle, the improvement comprising:

maintaining within each of said compensator zones an adsorbent bed having an affinity for unselected adsorbable components contained in said feed gas stream;

passing a portion of said regeneration gas stream containing desorbed components through one of said compensator zone adsorbent beds during each cycle so that unselected adsorbable components are adsorbed on said bed and a residual product gas stream containing selected adsorbable components is produced; and passing a portion of said cooling gas stream through the other of said compensator zone adsorbent beds during each cycle so that the unselected adsorbable components adsorbed thereon during the previous cycle are desorbed therefrom into said portion of said cooling gas stream and a stream rich in said unselected adsorbable components is produced.

14. The process of claim 13 wherein said stream rich in unselected components is withdrawn from said process.

15. The process of claim 13 wherein the stream rich in unselected components is combined with said residue gas stream.

16. The process of claim 13 which is further characterized to include the steps of:
cooling said regeneration gas stream containing desorbed adsorbable components prior to passing it into said compensator zone so that a portion of said desorbed components are condensed; and
separating said condensed desorbed components from said regeneration gas stream.

* * * * *

UNITED STATES PATENT OFFICE
CERTIFICATE OF CORRECTION

Patent No. 3,712,027                    Dated January 23, 1973

Inventor(s) JOHN W. HASZ

It is certified that error appears in the above-identified patent and that said Letters Patent are hereby corrected as shown below:

In the Abstract, second line from the bottom, "described" should read -- adsorbed -- . Column 14, under Table VI, "Since the capacity of the molecular sieve for carbon dioxide at 600 psia and 200° 13.76" should read -- Since the capacity of the molecular sieve for carbon dioxide at 600 psia and 200°F is -- . Column 15, top of page, "0.3 pounds 100.00 carbon dioxide per 100 pounds of molecular sieve, the minimum quantity of molecular sieve required gas) calculated as follows:" should read -- 0.3 pounds of carbon dioxide per 100 pounds of molecular sieve, the minimum quantity of molecular sieve required is calculated as follows: -- .

Signed and sealed this 20th day of November 1973.

(SEAL)
Attest:

EDWARD M. FLETCHER, JR.
Attesting Officer

RENE D. TEGTMEYER
Acting Commissioner of Patents